United States Patent
Godby

(10) Patent No.: US 8,770,655 B1
(45) Date of Patent: Jul. 8, 2014

(54) INNER PROTECTIVE FRAME FOR WHEEL WELLS

(76) Inventor: Michael E. Godby, Las Vegas, NV (US)

( * ) Notice: Subject to any disclaimer, the term of this patent is extended or adjusted under 35 U.S.C. 154(b) by 0 days.

(21) Appl. No.: 13/418,277

(22) Filed: Mar. 12, 2012

Related U.S. Application Data

(60) Provisional application No. 61/452,107, filed on Mar. 12, 2011.

(51) Int. Cl.
B62D 25/16 (2006.01)

(52) U.S. Cl.
CPC .................................. B62D 25/163 (2013.01)
USPC ............ 296/198; 280/770; 280/848; 280/854

(58) Field of Classification Search
USPC .......... 296/198, 203.03, 205; 280/152.2, 154, 280/160, 161, 770, 847, 848, 850, 851, 280/854; 293/112
See application file for complete search history.

(56) References Cited

U.S. PATENT DOCUMENTS

| | | | |
|---|---|---|---|
| 3,913,943 A * | 10/1975 | Tamburino et al. | 280/856 |
| 4,921,276 A * | 5/1990 | Morin | 280/848 |
| 5,613,710 A | 3/1997 | Waner | |
| 5,950,975 A * | 9/1999 | Zieske | 248/291.1 |
| 6,648,373 B2 * | 11/2003 | Hawes | 280/854 |
| 7,703,804 B2 * | 4/2010 | Cymbal et al. | 280/775 |
| 2004/0026914 A1* | 2/2004 | Jain et al. | 280/848 |
| 2004/0135362 A1* | 7/2004 | Banry et al. | 280/847 |
| 2007/0187941 A1* | 8/2007 | Eklund et al. | 280/848 |

* cited by examiner

Primary Examiner — Glenn Dayoan
Assistant Examiner — Jason S Daniels
(74) Attorney, Agent, or Firm — John C. Lambertsen; Kenehan & Lambertsen, Ltd.

(57) ABSTRACT

A protective frame for placement within enlarged wheel wells of motor vehicles having dual wheel rear fenders includes outer and inner frame rails that are attached together using multiple cross-frame supports. Attachment panels extend from the joined frame rails for attachment to the vehicle frame. An additional attachment panel is optionally provided for attachment of the protective frame to a rear hitch frame, where the latter is also attached to the motor vehicle. A rock kick-out plate can be attached to the protective frame and positioned between the two wheels for off-road use in removing wedged rocks, avoiding damage from thrown rocks upon the resumption of on-road use of the vehicle.

1 Claim, 2 Drawing Sheets

INNER PROTECTIVE FRAME FOR WHEEL WELLS

RELATED APPLICATIONS

The present application claims priority under 35 U.S.C. §119(e) to U.S. Provisional Patent Application Ser. No. 61/452,107, filed Mar. 12, 2011, which is incorporated by reference herein for all that it contains.

BACKGROUND OF THE INVENTION

1. Field of the Invention

The present invention relates to structural reinforcing frames and, more particularly, to protective reinforcement frames for motor vehicles. More specifically, the present invention relates to a protective reinforcement frame received within an enlarged wheel well of a dual rear wheel fender.

2. Description of the Prior Art

The largest full-sized pickups feature doubled rear tires, two on each side of a single axle, and are known as "dualies" or dual-wheeled pickup trucks. The outer tires track outside of the truck body, and dually fenders are provided to extend the truck body out and around the top portion of the outer tire in an effort to protect it from mud and rocks thrown by the spinning tires.

Such dually fenders are typically formed of plastic or fiberglass, and provide some degree of protection to the surrounding truck body surfaces. Dually fenders are susceptible to great damage as a result of a tire blowout or tread separation. Frequently the only repair possible is complete replacement of the entire fender—and often replacement of the adjacent body panel(s). Such repairs, including body work, paint, and loss-of-use of the vehicle, can easily exceed one thousand dollars—plus the cost to replace the blown tire(s).

SUMMARY OF THE INVENTION

In much the same manner as a tubular-constructed roll cage is used to protect racing car drivers from injury, a protective tubular frame is constructed within the dually fender and is attached to the truck body. The tubing may be powder-coated to any color—matching the fender or as an accent color—or to match pre-existing vehicle pin striping.

Upon encountering a tire blowout, as the tire disintegrates and pieces are thrown off with great force into the dually fender, the protective tubular frame absorbs the impacts, protecting the plastic or fiberglass surfaces from destructive forces. When metal screening is mounted onto the frame, extending between the tubular frame members, smaller rocks thrown from the tires are prevented from impacting the much weaker plastic and fiberglass surfaces of the dually fenders. Such smaller stone impacts can be sufficiently severe to result in the dimpling of the fender surface and the cracking of the outer fender paint.

In an aspect of the present invention an inner protective frame for a dual wheel fender defining an enlarged wheel well in a rear quarter panel of a vehicle, said inner protective frame comprising: an outer frame rail; an inner frame rail attached to said outer frame rail; a plurality of cross-frame supports extending between and attached to both said outer frame rail and said inner frame rail; and a pair of frame attachment panels attached to and inwardly extending from said inner frame rail, a first one of said frame attachment panels extending from a location adjacent a first longitudinal end of said inner frame rail and a second one of said frame attachment panels extending from a location adjacent a second longitudinal end of said inner frame rail, each of said pair of frame attachment panels suited to be attached to a frame of said vehicle adjacent said enlarged wheel well.

In a further aspect of the present invention an inner protective frame for a dual wheel fender having a forward longitudinal fender section, a top longitudinal fender section, and a rear longitudinal fender section that together define an enlarged wheel well in a rear quarter panel of a vehicle, said inner protective frame comprising: an outer frame rail suited for being received within an outboard location within said enlarged wheel well; an inner frame rail attached to said outer frame rail and suited for being received within an inboard location within said enlarged wheel well; and a plurality of attachment panels outwardly extending from and attached to said inner frame rail at spaced apart locations from one-another, each of said plurality of attachment panels suited to be attached to a frame of said vehicle adjacent said enlarged wheel well.

It is to be understood that the invention is not limited in its application to the details of construction and the arrangement of components described hereinafter and illustrated in the drawing figures. Those skilled in the art will recognize that various modifications can be made without departing from the scope of the invention.

BRIEF DESCRIPTION OF THE DRAWINGS

Embodiments in accordance with the present invention are described below in connection with the accompanying drawing figures.

DESCRIPTION OF THE PREFERRED EMBODIMENTS

Figure 1:
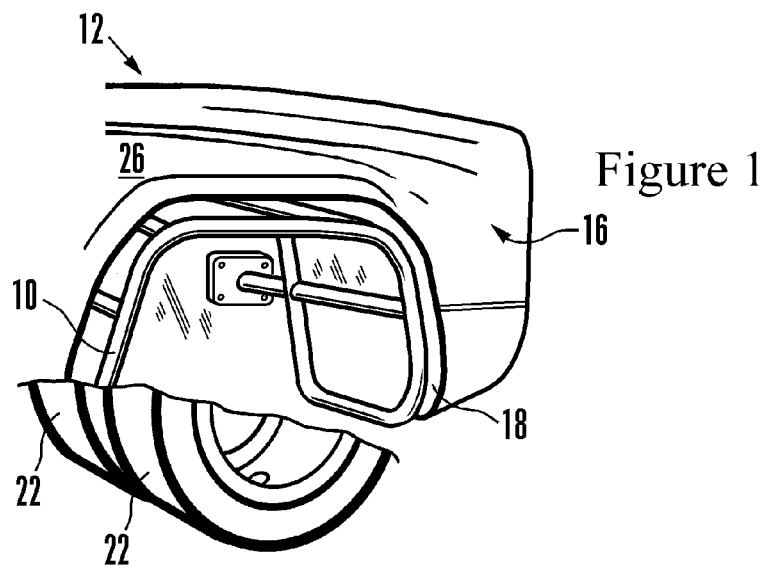
FIG. 1 is a partial perspective view, with portions broken away, of a rear quarter-panel for a dual-wheeled pickup truck showing an attached inner protective frame within a wheel well in accordance with the present invention.

Reference is now made to the drawings wherein like structures refer to like parts throughout, and more particularly, reference numeral 10 refers to an inner protective frame in accordance with the present invention for use on a pickup truck (as well as other motor vehicles, such as vans and larger SUV's) with dual rear wheels (termed "dualies"). In FIG. 1 a pickup truck 12 includes a truck body with a rear quarter panel 16 having an enlarged wheel well 18. A pair of tires 22 are mounted on an extended axle (not shown in FIG. 1) and are received within the wheel well 18.

An enlarged fender 26 is attached to the rear quarter panel 16 and extends out from the truck body to substantially enclose at least the upper portion of the tires 22. The enlarged fender 26 is typically formed of an epoxy-fiberglass material and has a substantially flat top that extends out from side of the rear quarter panel 16.

Figure 2:
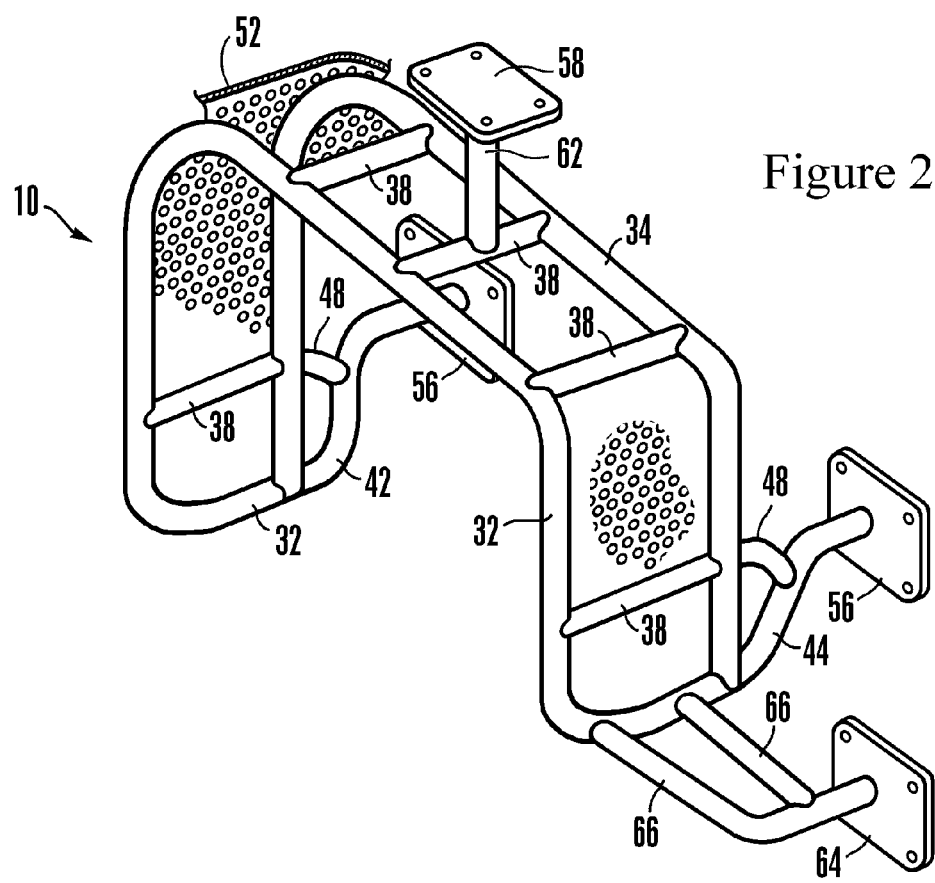
FIG. 2 is a perspective view, with portions broken away, of an inner protective frame in accordance with the present invention.

Referring now to FIG. 2, the inner protective frame 10 includes an outer frame rail 32 and an inner frame rail 34, with a plurality of cross-frame supports 38 extending between and connecting the outer frame rail 32 to the inner frame rail 34.

In a presently preferred embodiment, as is shown in FIG. 2, the outer frame rail 32 is curved in a manner that generally conforms to the curvature of the wheel well 18. A front and a rear section of the outer frame rail 32 each terminate in an inwardly curved manner forming a front frame attachment extension 42 and a rear frame attachment extension 44. In a similar manner the inner frame rail 34 is curved to conform to the curvature of the wheel well 18 and terminates at a front and rear section by attachment to the respective front and rear attachment extensions 42, 44 of the outer frame rail 32. An extension support 48 extends from a front and rear section of the inner frame rail 34 and attaches to a respective front and rear attachment extension 42, 44 in a manner providing additional structural integrity to the inner protective frame 10. Metal screening 52 is preferably attached to and extends between the outer frame rail 32 and the inner frame rail 34 to protect the inner surface of the enlarged fender 26 from smaller rocks thrown by the tires. As mentioned previously, the impact from such smaller stones can result in the surface dimpling of the outer fender as well as the cracking of the outer fender paint.

Both the front and rear attachment extensions 42, 44 terminate in a frame attachment panel 56, which in turn may be selectively attached to the truck frame. A top attachment panel 58 is also provided, with a top attachment support 62 extending from an upper cross-frame support 38. The top attachment panel 56 permits attachment of the inner protective frame 10 to a location on an inner fender frame of the pickup truck 12. Additional integrity of the connection between the inner protective frame 10 and the pickup truck 12 may optionally be obtained using a rear, trailer hitch attachment panel 64 that is attached to the rear frame extension 44 utilizing a pair of hitch attachment supports 62. The trailer hitch attachment panel 64 is attached to a hitch frame 68 that itself is attached to the rear of a pickup truck 12.

Figure 3:
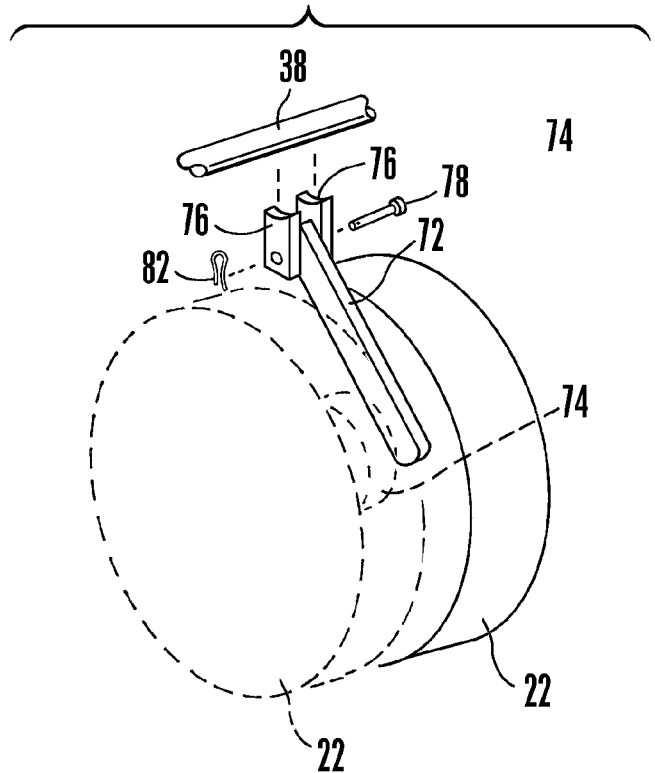
FIG. 3 is an exploded perspective view, with portions broken away and portions in phantom, showing a wedged rock removal plate attached to an inner protective frame in accordance with the present invention.

FIG. 3 illustrates a further addition to this protective concept, the addition of a rock kick-out plate 72, which can consist of a piece of flat stock steel that is inserted between the tires and is pivotally mounted such that the kick-out plate 72 rides upon a wheel axle 74 that is exposed between the two tires 22. The rock kick-out plate 72 is attached to the centrally-located cross-frame support 38 using a pair of attachment plates 76 that are welded to the cross-frame support 38. A pair of attachment apertures are formed, one in each of the attachment plates 76 and are co-linearly arranged such that an attachment pin 78 can be received therein.

An attachment aperture is likewise formed in the kick-out plate 72 and upon placement of the kick-out plate 72 between the pair of attachment plates 76 enables placement of the attachment pin 78 through each of the respective attachment apertures, with an attachment clip 82 used to retain the kick-out plate 72 in position between the pair of tires 22. When off-roading, running the tires through rocks can result in the wedging of rocks between the two adjacent wheels. Upon returning to pavement or a smooth, flat surface, the higher speeds typically result in the wedged rock breaking free and impacting the fender or being thrown out behind the vehicle—hitting any following vehicle.

The rock kick-out plate 72 kicks out any wedged rocks as they are picked up during off-roading use of the vehicle, preventing the normal series of events just described. Upon termination of the off-roading use, the kick-out plate 72 is easily removed upon disassembly of the attachment pin 78 and attachment clip 82 connection.

Figure 4:
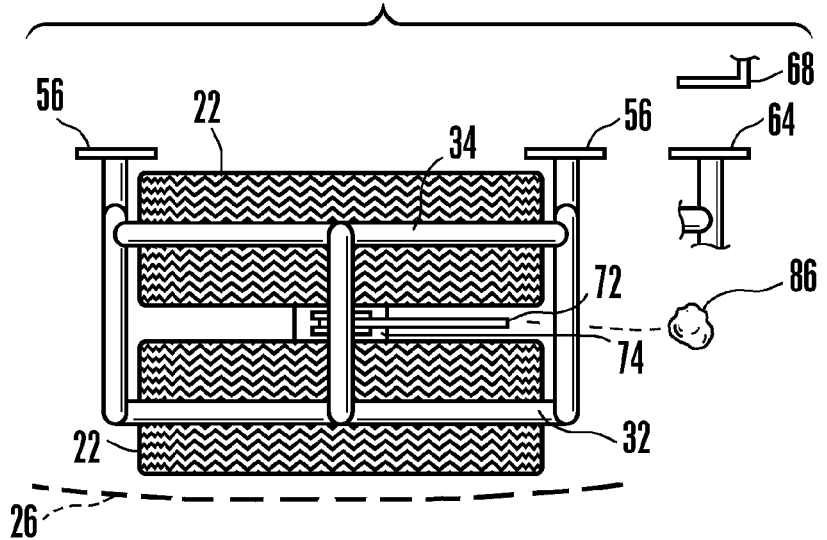
FIG. 4 is a top plan view, with portions broken away and a portion shown in phantom, of dual-wheel tires received within an inner protective frame and an attached rock removal plate in accordance with the present invention.

FIG. 4 illustrates the locations of the tires 22 relative to the inner protective frame 10, which is located inside of the outer surface of the enlarged fender 26. In particular, the outer frame rail 32 and the inner frame rail 34 are substantially centered about the outer and inner tires 22, respectively. Should either tire 22 suffer a blowout and disintegrate, the pieces will strike the outer and/or inner frame rails instead of the enlarged fender 26. Since the majority of tires include reinforcing metal cords, a disintegrating tire, with pieces being thrown out with great force and velocity, can do great damage to the epoxy-fiberglass material making up the enlarged fender 26. The outer and inner rails absorb such energy, protecting the enlarged fender 26.

In a presently preferred embodiment the inner protective frame 10 is fabricated as a unit, and is designed to be bolted to the truck frame in two or three locations. By way of example and not limitation, Chromalloy tubing or mild steel 134 formed as 1⅝ inch roll cage tubing are appropriate for construction of the protective cage. It is also contemplated to utilize smaller-diameter tubing.

The presently-described protective fender frame can be utilized to protect fenders other than the dually fenders. For example, such tubular frames can be appropriated fitted into concession trailers, camper trailers, semi-trucks and trailers, Sports Utility Vehicles ("SUV's"), automobiles or any vehicle having a body part framing a wheel well. In all of these applications the protective frame within the wheel well will decrease if not eliminate damage to the outer fenders occurring from tire blow outs. Repairs will cost less and take less time to complete. Replacement costs will be less, resulting in lower insurance payouts—and decreased premiums.

My invention has been disclosed in terms of a preferred embodiment thereof, which provides an inner protective frame for wheel wells that is of great novelty and utility. Various changes, modifications, and alterations in the teachings of the present invention may be contemplated by those skilled in the art without departing from the intended spirit and scope thereof. It is intended that the present invention encompass such changes and modifications.

I claim:

1. An inner protective frame for a dual wheel fender defining an enlarged wheel well in a rear quarter panel of a vehicle, said inner protective frame comprising:
    an outer frame rail;
    an inner frame rail attached to said outer frame rail;
    a plurality of cross-frame supports extending between and attached to both said outer frame rail and said inner frame rail;
    a pair of frame attachment panels attached to and inwardly extending from said inner frame rail, a first one of said frame attachment panels extending from a location adjacent a first longitudinal end of said inner frame rail and a second one of said frame attachment panels extending from a location adjacent a second longitudinal end of said inner frame rail, each of said pair of frame attachment panels suited to be attached to a frame of said vehicle adjacent said enlarged wheel well; and
    a trailer hitch attachment panel attached to and extending from a location on said inner protective frame adjacent said second longitudinal end of said inner frame rail, said trailer hitch attachment panel suited to be attached to a hitch frame that is attached to said vehicle at a location that is rearwardly adjacent said enlarged wheel well.

* * * * *